United States Patent [19]

Hartwimmer

[11] 4,076,760

[45] Feb. 28, 1978

[54] PROCESS FOR THE PREPARATION OF FLUOROCARBON WAXES

[75] Inventor: Robert Hartwimmer, Burghausen, Salzach, Germany

[73] Assignee: Hoechst Aktiengesellschaft, Frankfurt am Main, Germany

[21] Appl. No.: 561,230

[22] Filed: Mar. 24, 1975

Related U.S. Application Data

[63] Continuation of Ser. No. 155,650, Jun. 22, 1971, abandoned.

[30] Foreign Application Priority Data

Jun. 24, 1970 Germany .............................. 2031046

[51] Int. Cl.$^2$ ............................................. C07C 19/00
[52] U.S. Cl. ............................... 260/653.1 R; 260/653
[58] Field of Search .......................... 260/653.1 R, 653

[56] References Cited

U.S. PATENT DOCUMENTS

| 2,759,983 | 8/1956 | Waddell | 260/653 |
| 2,933,536 | 4/1960 | Wall et al. | 260/653.1 R |
| 2,978,519 | 4/1961 | Fischer | 260/653.1 R |
| 3,223,739 | 12/1965 | Teumac | 260/653.1 R |

FOREIGN PATENT DOCUMENTS

| 461,430 | 11/1949 | Canada | 260/653.3 |

*Primary Examiner*—C. Davis
*Attorney, Agent, or Firm*—Connolly and Hutz

[57] ABSTRACT

The present invention relates to a process for the preparation of low molecular weight fluorocarbon waxes by thermic cracking of polytetrafluoroethylene or copolymers of tetrafluoroethylene and higher perfluoro-olefins at elevated temperatures and under increased pressure.

4 Claims, No Drawings

PROCESS FOR THE PREPARATION OF FLUOROCARBON WAXES

This application is a continuation of application Ser. No. 155,650 filed June 22, 1971 and now abandoned.

The present invention relates to a process for the preparation of low molecular weight fluorocarbon waxes.

From the description of U.S. Pat. No. 2,496,978 it is known that a brittle polytetrafluorethylene wax having a relatively high molecular weight and a melting point of from 320° to 327° C can be obtained by a several hour heat treatment of pure polytetrafluorethylene at temperatures of from 450° to 500° C and under normal pressure. However, by this pyrolysis, only about 60% of the polytetrafluorethylene used are obtained as wax, about 40% of the valuable starting substance become volatile in the form of fractions of very low molecular weight (for example tetrafluoroethylene, hexafluoropropene, perfluorocyclobutane), and thus are lost in the process.

A brittle, insoluble fluorocarbon wax having a similarly high molecular weight and a melting point above 300° C is obtained, though with better yields, by pyrolysis of polytetrafluorethylene at temperatures of from 400° to 500° in a salt melt (German Patent No. 1,049,099). According to British Patent No. 1,074,768, sublimable fluorocarbon waxes having a somewhat lower melting point but still being insoluble are obtained, also with very poor yeilds, by completely cracking polytetrafluorethylene and by separating the easily condensable waxes from the escaping degradation products. The yield of fluorocarbon waxes is very poor (from 10 to 20%), since the substantial part of the degradation products are compounds having from 2 to 4 carbon atoms. Moreover, a considerable pyrolysis residue of pure carbon is remaining. From this patent results furthermore that the molecular weight of the sublimation waxes obtained may be varied and controlled within certain limits by a suitable pre-determinaton of the pressure. Thus, at atmospheric pressure, a fluorocarbon wax having a melting range of from 270° to 278° C is obtained, and at a pre-determined low pressure of from 5 to 100 mm Hg, but otherwise under the same conditions, fluorocarbon waxes having a 50% lower melting range are prepared. Consequently, low pressure enhances the formation of low molecular weight degradation products. This appears also during the thermic degradation of polytetrafluorethylene in high vacuum; according to the literature references, under these conditions a nearly quantitative degradation to monomer tetrafluoroethylene occurs (Madorsky et al., J. Res. NBS 51,327-333; R. E. Florin et al., J. Res. NBS 56, 27; J. C. Siegle et al., J. Polymer Sci. Vol. 2, 391-404).

On account of the results cited above, a preparation by pyrolysis of fluorocarbon waxes having still lower molecular weights and a still lower melting point, which are soluble in solvents, could only be expected in the low pressure range, under quite special conditions and probably with low yields, if there would be any results at all.

Surprisingly and against all expectations, it has now been found that such fluorocarbon waxes formed only from carbon and fluorine atoms, having an advantageous melting range of from 30° to 280° C, especially from 40° to 200° C, and being partially soluble in solvents can be obtained in a relatively easy manner and with high yields by carrying out the pyrolysis of polytetrafluorethylene at elevated temperatures as well as under increased pressure.

Subject of the present invention therefore is a process for the preparation of fluorocarbon waxes above all of low molecular weight by thermic cracking of polytetrafluorethylene or copolymers of tetrafluorethylene and higher perfluoroolefins at elevated temperatures and under increased pressure, wherein the pyrolysis is carried out at temperatures of from 350° to 700° C and partial pressures of the degradation products of from 5 to 100 atmospheres gauge, optionally in the presence of inert gases and catalysts.

The pyrolysis may be carried out within a wide range of temperatures, practically between 350° and 700° C. However, in order to avoid too long reaction times on the one hand and an enhanced formation of undesirable by-products on the other, it is advantageous to carry out the pyrolysis at temperatures of from 450° to 600° C.

The heating time varies in accordance with each special case, since it depends on the capacity of the reaction vessel as well as on the efficiency of the heating elements. The reaction time, i.e., the time which passes until the pressure required according to the present invention or the partial pressure of the degradation products had adjusted itself on the basis of the pre-determined pyrolysis temperature, in accordance with the temperature chosen varies from 0.5 to 20 hours, preferably from 1 to 10 hours.

An economically acceptable pyrolysis time varies from about 2 to 8, preferably from 2 to 5 hours. The above cited temperature range of from 450° to 600° C is valid especially in accordance with these time data.

In principle, it is also possible to prepare the compounds of the invention at temperatures below 350° C if a sufficient pyrolysis time is chosen. However, such a process would be of no advantage with regard to its profitability. The same goes for too high pyrolysis temperatures which — besides resulting in a yield decrease — on account of relatively long heating or cooling periods do not bring about substantial advantages by possible saving of time, at least not when operating discontinuously.

For carrying out the pyrolysis, pressure vessels of any design may be used, as far as they comply with the pressure and temperature ranges required according to the present invention with regard to their dimensions and their safety, and as far as the accessory equipment ensures the necessary heating effect. For example, high pressure autoclaves, bomb tubes and tube autoclaves may be used. As material, high temperature resistant alloys, for example V 4A, Hastelloy ®, nickel, Tinidur K ® et. are recommended. Also continuously operating apparatuses as far as they withstand the required pressures may be successfully used. Besides normal pressure and temperature measuring devices, an automatic control or programming of the temperature course is recommended. The heat should be transferred to an area as large as possible, preferably to all sides of the pressure vessel.

Furthermore, for safety reasons, on account of the high increase of pressure, it is recommended to feed only a limited amount of polytetrafluorethylene in the pressure vessel. Advantageously, the feeding volume is about 30 to 40% of the total volume; however, different feeding rates may be chosen.

After the pressure vessel filled with compact polytetrafluorethylene has been flushed with nitrogen or another inert gas, it is tightly closed and the heating is started. With the temperature rising and the time passing, a total pressure is establishing itself from the partial pressure of the inert gas used for flushing and from the partial pressures of the degradation products formed. The partial pressure of the degradation product is in a direct relation of the degradation degree of the polymer existing at the very moment; thus, a control of the pyrolysis in accordance with the course of the pressure is possible.

By the process of the invention, according to desire and demand, high molecular weight fluorocarbon waxes (molecular weight from about 30,000 to more than 100,000, preferably 100,000) which until now have been obtained only in poor yields can be prepared as well as low molecular weight fluorocarbon waxes (molecular weight from about 300 to 10,000) and, optionally, also waxes of types in between (molecular weight preferably from about 10,000 to 30,000).

Under these conditions, in the course of the pyrolysis a partial pressure of the degradation products of from 5 to 100 atm/g may establish itself, but a pressure of preferably from 15 to 60 atm/g will suffice for the formation of waxes. Under certain circumstances, pressure of from 15 to 50 atm/g are sufficient.

When the pyrolysis is stopped at a time where the partial pressure of the degradation products is still low, for example about 10 to 30 atmospheres gauge, fluorocarbon waxes are obtained which melt in the range of from 150° to 300° C; on the other hand, when the reaction is terminated after a partial pressure of from 30 to 60 atmospheres gauge or more has established itself, already soluble fluorocarbon waxes having a low melting point are obtained to a great extent.

In order to terminate the pyrolysis, the heating devices are switched off after the necessary reaction time has passed, and subsequently the vessel and its content are allowed to cool, which causes a decrease of the pressure in the reaction vessel to a few atmospheres. It is also possible — this is for example advantageous in a continuous operation — to release the pressure of the vessel already at a relatively high temperature and to condense the degradation products in suitable multiple-step cooling systems. In a modification of the process, it is also possible to pre-determine a distinct pressure in the reaction vessel before the beginning of the pyrolysis by means of an inert foreign gas, for example nitrogen or argon, or a gas similar in nature to the gaseous pyrolysis products, for example tetrafluoromethane, hexafluoroethane, tetrafluorethylene etc.

Suitable starting materials for the process of the invention generally are all fluorocarbon compounds of mean and high molecular weight, for example pure polytetrafluorethylene and its copolymers with other perfluoro-olefins, such as hexafluoropropene and perfluoro-isobutylene (molecular weight of from 0.5 to 7 million), furthermore high molecular weight polytetrafluorethylene waxes having a melting range of and above 300° C (molecular weight from about 10,000 to 100,000), as well as already sublimable fluorocarbon waxes having a melting range of from 220° to 280° C (molecular weight of from 1000 to 10,000).

The above-mentioned copolymers are especially copolymers of tetrafluorethylene and other perfluoro-olefins, preferably hexafluoropropene or perfluoro-isobutylene, the amount of which in the copolymer advantageously is from 5 to 40% by weight, preferably from 20 to 30% by weight.

Not only pure polytetrafluorethylene and the copolymers thereof may be used as starting material according to the process of the invention, but also all waste products occurring during the production or processing of these plastics which generally do not find a useful application may advantaneously serve for the purposes of the present invention. Thus, for example, all spoiled batches and/or smudged product parts, sieve or work-up residues of the production, all scraps and swarfs of machining and extruding plants for polytetrafluorethylene, as well as defective shaped articles from moulding and sintering processes may be used as starting material.

Generally, no further additives are added to the material to be subjected to pyrolysis. However, it has been found that small amounts, for example of from 0.1 to 5% by weight, preferably from 0.5 to 2% by weight, calculated on the polymer used, of certain catalysts accelerate the degradation of the high molecular weight fluorocarbon compounds, thus resulting in a considerably shortened pyrolysis time, decreased pyrolysis temperatures or increased formation of the low molecular weight waxes.

The following catalysts are preferably used: nitric oxides, especially NO, $NO_2$ or mixtures thereof, sulfur oxides, especially $SO_2$, nitrosyl, thionyl, sulfuryl and nitroso compounds, especially fluorides and chlorides. Furthermore, also those substances may be used for the indicated purpose which, under the pyrolysis conditions cited, set free the above-mentioned compounds, for example amidosulfonic acid, potassium nitrite or silver nitrate.

Since the pyrolysis is carried out in a closed system, there are nearly no losses of substance. When the pressure of the cooled pressure vessel is released, at first the gaseous pyrolysis products escape, especially the low boiling fluoro-alkanes or -alkenes having from 2 to 4 carbon atoms, and various other low molecular weight compounds which are not identified. The amount of these compounds in the reaction product is at an average of from 3 to 5%, 10% at the utmost.

When the vessel is opened, according to the test conditions either a cream-like greasy or a crumbly solid mass of whitish-yellow to honey-brown colour is obtained which amounts to 90 to 98% of the starting substance used. A formation of carbon, as is described in British Patent No. 1,074,768, does not occur in the process of the invention.

The crude wax prepared in this way is composed of mainly solid, well crystallizable fluorocarbon compounds. The sometimes creamlike consistency of the crude product is due to small amounts of already liquid fluorocarbon compounds.

But also the solid and crystallized fluorocarbon waxes on account of their formation are not homogeneous. They are a mixture of chin fragments of different length formed according to statistical principles from the formerly high molecular weight polytetrafluorethylene molecules; i.e. they are mixtures of fluorocarbon compounds having different molecular weights, different melting points and different solubility degrees. In order to use this crude wax for further applications, its separation into fractions of melting ranges as narrow as possible is recommended.

This separation of the crude wax may be carried out according to the normal physical and physico-chemical separation methods, for example by fractional vacuum distillation or fractional steam or solvent vapor distillation; in the case of small substance amounts, above all separation methods based on the different solubility degree in various solvents are recommended. All these techniques yield easily crystallizable products having narrow melting ranges. In the case of soluble portions, a fractional crystallization may also be carried out with success.

The wax fractions so obtained generally are in the form of purely white easily crystallized substances. When they are separated according to the solubility method, an insoluble residue remains which may be after-purified and separated by distillation.

The separation of the crude waxes prepared according to the process of the invention clearly shows the very differences of the single flourocarbon compounds united in the crude mixture with regard to their molecular weight. Thus, the compounds having the lowest molecular weight already melt at temperatures below 40° C (molar range from about 300 to 500), while the high molecular weight fractions are converted into a clear melt at temperatures above 200° C. Compounds having melting points in between may be also separated in accordance with the necessity or desire prevailing in each case.

The solubility of the fluorocarbon waxes prepared according to the process of the invention greatly depends on the molecular weight of the single components. Thus, the low melting waxes having a melting range of from 30° to 80° C are easily soluble in various organic solvents, for example in halo-hydrocarbons, especially those which are perhalogenated, such as dibromo-tetrafluoro-ethane, in FRIGEN®, furthermore they are also soluble in numerous aromatic solvents, for example toluene, xylene, benzotrichloride, benzalchloride, furthermore in a series of higher ketones, alcohols and esters, as well as in many derivatives of cyclohexane. A certain solubility is given also in silicone oils, in various metal-organic compounds, for example alkyl-tin-halides, and in some inorganic compounds, for example tin tetrachloride, titanium tetrachloride and phosphorus oxychloride. Also the fractions having a melting range of from 80° to 110° C are easily soluble still in many of the afore-mentioned solvents. Waxes having a melting point of 150° C are soluble only in small amounts in perhalogenated alkanes rich in fluorine, in some special aromatic substances containing halogen, and in certain silicone and halocarbon oils.

All of the waxes obtainable by the process of the invention have already a molecular weight so low that they can be easily distilled without decomposition under decreased pressure or in vacuo.

The waxes prepared according to the process of the invention are used above all as additives in the coating, lubricant and wax fields, thus substantially improving the properties of the cited products. The soluble fluorocarbon waxes may also be used as sprays for obtaining water- and oil-repellent properties or corrosion resistance. The fluorocarbon waxes having a high melting point are valuable dry lubricants and lubricant additives; above all, mixtures of these waxes with other plastics, such as polyacetales, polypropylene, polyamides, phenol or epoxy resins, serve for the manufacture of self-lubricating bearings, pulleys, gear wheels, worms, slides or other pieces of apparatuses being under a considerable friction strain.

All fluorocarbon waxes are valuable auxiliaries in metal processing industry, where they are increasingly used as mould release agents and additives for deep drawing processes.

The following examples illustrate the invention.

EXAMPLE 1

1500 g of polytetrafluorethylene (scraps of a sliced sheet manufacturing plant) are introduced into a 2.5 liter high pressure autoclave made from the high temperature resistant material Tinidur K ®, and the autoclave is carefully tightened. The tightness of the apparatus is tested by applying a pressure of 100 atmospheres gauge of $N_2$; the pressure is then released again and the autoclave is flushed for some time with $N_2$. After all valves are closed, the heating device is switched on and the content of the autoclave is rapidly heated to a temperature of 540° C. This temperature is maintained for 3¼ hours in order to affect the product locked in the reaction vessel. During this time, an internal pressure of 51 atm/g establishes itself. After the 3¼ hours, the test is terminated, the reaction vessel is allowed to cool, its internal pressure is released over a cooling trap cooled to −80° C, the plug is unscrewed and the pasty content of the vessel is emptied directly into a multi-neck distilling flask which has been cooled to −25° to −30° C. On this distilling flask, an efficient packed column of medium height is mounted. A boiling capillary tube, a sump and a top thermometer, as well as a descending condenser equipped with a distributor device and a receiver flask complete the apparatus. Furthermore, it is taken care that in proper time the apparatus can be operated in vacuo and that the cooling jacket can alternatively be cooled or heated. Before the vacuum pump is connected, the already used cooling rap is mounted, which is now cooled with liquid nitrogen. Inert gas is allowed to slowly flow through the apparatus, then the cooling bath beneath the distilling flask is removed and the whole is slowly heated. A small part of the reaction products escapes in gaseous form and is condensed in the subsequently connected cooling trap. Up to a top temperature of about 130° C and under normal pressure, a number of colourless fluorocarbon compounds which remain liquid at room temperature passes over and is collected in a receiver.

The cooling water is then heated to 50° C and the distilling flask is heated more intensely, so that, at top temperatures of from 130° to 180° C, the first fluorocarbon waxes pass over and become solid in the receiver.

The distillation is then continued in vacuo, but beforehand the sump has to be cooled to about 40° to 50° C, and the receivers have to be replaced. As soon as this has been done, the apparatus is connected to a water jet vacuum pump at a pressure of from 15 to 17 mm Hg and, at slowly rising sump temperatures, further fluorocarbon wax fractions pass over at the top, while, advantageously, the liquid circulating in the cooling jacket should have a temperature just above the melting point of the wax fraction distilling over at the very moment. Since the top temperature generally is steadily rising without any standstill worth mentioning, the number of fractions may be chosen as desired. If necessary and if the melting points of the substances do not substantially exceed 150° C, the single wax fractions may be recrystallized from suitable solvents.

In this test, 1464 g of pyrolysis product, i.e. 97.6% of the quantity used, are obtained. By the distillation, the pyrolysis product is separated into the following fractions: (Table p.15)

| Fraction | Substance | Boiling range | | | Pressure | Melting Range within | | Quantity | |
|---|---|---|---|---|---|---|---|---|---|
| | | | | | | | | g | % |
| 1 | gaseous pyrolysis products | below | | 20° C | normal | | | 100 | 6,8 |
| 2 | liquid pyrolysis products | 20° C | - | 130° C | normal | | | 210 | 14,0 |
| 3 | fluorocarbon wax | 130 | - | 175° C | normal | 30- | 50° C | 27 | 1,8 |
| 4 | " | 65 | - | 120° C | 15–17 mm | 50- | 80° C | 88 | 6,0 |
| 5 | " | 120 | - | 160° C | 15–17 mm | 90- | 120° C | 202 | 13,7 |
| 6 | " | 160 | - | 200° C | 15–17 mm | 120- | 180° C | 299 | 20,5 |
| 7 | " | 200 | - | 280° C | 15–17 mm | 180- | 220° C | 150 | 10,2 |
| 8 | " | 280 | - | >300° C | 15–17 mm | 220- | 260° C | 110 | 7,5 |
| 9 | " | residue | | | 15–70 mm | 260- | 290° C | 260 | 17,8 |

EXAMPLE 2

According to Example 1, 1–4 kg of coarse, scaled polytetrafluorethylene material as is obtained for example by crushing defective shaped articles which may also be torn in the sintering process (rejects) in a crusher or a cutting mill are introduced into the 2.5 liter Tinidur K ®autoclave. After a tightness test and a careful flushing with $N_2$, the autoclave is heated to 495° C, and this temperature is maintained for 8¼ hours. During the reaction, a pressure of 36 atmospheres gauge is establishing itself in the pyrolysis vessel. When the autoclave later has cooled, the pressure is released and the vessel is emptied as is described in Example 1.

The separation of the crude pyrolysis product is also carried out by distillation.

In this test, 1400 g of polytetrafluorethylene are used, and a total 1347 g of pyrolysis product are collected, which corresponds to a yield of 96.2%. The distillation yielded the following fluorocarbon waxes:

| Fraction | Substance | Boiling range | Pressure | Melting range within | Quantity | |
|---|---|---|---|---|---|---|
| | | | | | g | % |
| 1 | gaseous pyrolysis products | below 20° C | normal | | 55 | 4 |
| 2 | liquid pyrolysis products | 20–130° C | normal | | 120 | 9 |
| 3 | fluorocarbon wax | 60–150° C | 15–17 mm | 60–120° C | 137 | 10 |
| 4 | " | 150–200° C | 15–17 mm | 120–180° C | 350 | 26 |
| 5 | " | 200–300° C | 15–17 mm | 200–240° C | 356 | 26,5 |
| 6 | " | >300° C | 15–17 mm | 240–280° C | 325 | 24 |
| | " | | | | 1 343 | |

EXAMPLE 3

1500 g of polytetrafluorethylene in the form of chips and shavings as generally obtained from punching presses and lathes of polytetrafluorethylene processing plants are fed in the autoclave already used and described in Example 1. The vessel is tightened, flushed with $N_2$ and the tightness is tested at 100 atm/g. The autoclave is then fully heated, so that its internal temperature rapidly rises to 570° C. In the reaction vessel, a pressure of 58 atmospheres gauge is slowly establishing itself. After 2 hours of reaction time, the test is terminated by switching off the heating device, and the autoclave and its content are allowed to cool. The remaining gas pressure is released over a cooled separator, the reaction vessel is then opened and its content is introduced into a distilling flask. The separation of the crude wax mixture is carried out as described in Example 1.

Reweighing of the collected pyrolysis products yields 1490 g, i.e. 99.3% of the material used. By the fractional distillation, the following separation of the crude pyrolysis product is obtained:

| Fraction | Substance | Boiling range | Pressure | Melting range within | Quantity | |
|---|---|---|---|---|---|---|
| | | | | | g | % |
| 1 | gaseous reaction products | <20° C | normal | | 200 | 13,4 |
| 2 | liquid reaction products | 20–130° C | normal | | 405 | 27,1 |
| 3 | fluorocarbon wax | 50–100° C | 15–17 mm | 40– 60° C | 70 | 4,7 |
| 4 | " | 100–160° C | 15–17 mm | 60–120° C | 218 | 14,7 |
| 5 | " | 160–210° C | 15–17 mm | 120–180° C | 212 | 14,2 |
| 6 | " | 210–300° C | 15–17 mm | 180–240° C | 269 | 18,1 |
| 7 | " | >300° C | 15–17 mm | 240–280° C | 111 | 7.5 |

EXAMPLE 4

300 of a copolymer containing more 93% of tetrafluorethylene and hexafluoropropylene for the remaining part are introduced into a pressure tube made from V 4A steel and having the following dimensions: length 90 cm, inside diameter 30 mm. outside diameter 44 mm, capacity therefore about 600 cm³. The pressure tube is put in a tube furnace equipped with an electric heating system and having a length of 75 cm and an inside diameter of 50 mm, and the still open tube ends are screwed with plugs equipped each with a valve and a manometer (from 1 to 300 atmospheres gauge). The tube is then flushed for a short time with nitrogen, the valves are closed and the furnace is rapidly heated to 520° to 525° C. This temperature is maintained for 4 hours. The manometer shows how a pressure of maximum 48 atm/g is slowly establishing itself. After these 4 hours, the reaction tube is allowed to cool, while the pressure is decreasing to 5 to 10 atm/g. The pressure of the reaction tube is then released over a cooling trap cooled to −80° C, the plug is opened and 300 ml of toluene which have been previously cooled to −25° C are added to the pasty content. The tube is thoroughly shaken and the whole content is emptied into a distilling flask. Reweighing shows that a substance yield of 296 g, i.e. 98.6% of the theoretical yield is obtained. 13 g thereof are volatile substances being gaseous under normal conditions, which are condensed in the separator.

The pasty reaction product absorbed in toluene is distilled over together with the solvent vapor via a vertically mounted Liebig condenser having a relatively wide cross section, while continuously replacing the distilled toluene, and via a subsequently connected cooling trap cooled by means of methanol/$CO_2$. The first product is an azeotropic mixture which separates into two layers in the receiver flask. The top layer is formed by toluene, the lower by liquid fluorocarbon compounds and fluorocarbon waxes dissolved in them. Both layers are separated in a separatory funnel. Subsequently, together with the toluene vapors, further amounts of low melting fluorocarbon waxes become volatile. They settle in the condenser in the form of a snow-white, micro-crystalline precipitate which is washed into the receiver flask by after-flowing toluene.

EXAMPLE 5

This and the following Example give evidence of the efficiency of the catalysts used according to the process of the invention, which catalysts enhance the formation of low molecular weight fluorocarbon waxes. In the V 4A pressure tube as described in Example 4 350 g each of polytetrafluorethylene (scraps of ram extruded rods having a diameter of 13 mm), one batch after the other, are exposed for 5 hours to a temperature of 505° C. The first batch is without any additive (test A), to the second 1% (=3.5 g) of potassium nitrate as reaction accelerator is added (test B). The different degradation degree of both these samples shows clearly after the separation of the crude pyrolysis products (see Table).

Material weighed in: 350 g each
Temperature: 505° C

In a subsequent test series the reaction time is determined which is necessary to obtain a crude wax mixture of a composition corresponding to test B without addition of a catalyst but maintaining the same temperature conditions. Without this addition of 1% of catalyst, such a pyrolysis product is obtained only after more than a 10 hours dwelling time, i.e. only after more than twice the original pyrolysis time (test C).

| Test | Time (hrs.) | Catalyst (%) | max. pressure atmosphere gauge | Yield % | Liquid g | Liquid % | 40-100 g | 40-100 % | 100-200 g | 100-200 % | 200-250 g | 200-250 % | 250-290 g | 250-290 % |
|---|---|---|---|---|---|---|---|---|---|---|---|---|---|---|
| Test A | 5 | — | 30 | 97,4 | 22 | 6,45 | 19 | 5,6 | 61 | 17,9 | 0 | 0 | 231 | 67,8 |
| Test D | 5 | 1 | 46 | 97,2 | 31 | 9,12 | 35 | 10,3 | 51 | 15 | 81 | 23,8 | 133 | 39,0 |
| Test C | >10 | — | 43 | 97,1 | 27 | 7,94 | 21 | 6,2 | 50 | 14,7 | 92 | 27,1 | 140 | 41,2 |

As soon as, after the first replacement of receiver, further 500 ml of distillate have passed over, the receiver is again replaced; the finely divided wax particles are separated from the toluene; the latter being fed back in the distillation flask. This operation is then repeated every 1000 ml, until only insignificant amounts of wax are passing over with the toluene. All toluene is then distilled off, and the whole operation is again repeated using cyclohexanone or cyclohexanol as solvent, in which operation further fluorocarbon waxes, melting range of from 120° to 160° C, are distilled over. The then remaining residue is purified by distillation or sublimation in vacuo. According to known methods, the fluorocarbon waxes are freed from the adhering solvent residues, and then dried.

A fractionation of the liquid substance mixture which has passed over in the azeotropic state (29 g) yields again 2 low melting wax fractions besides 20 g of fluorocarbon compounds remaining in liquid state.

Thus, from the pyrolysis product the following components can be isolated in the following amounts:

| Fraction | Substance | Melting range | Isolated from | Quantity g | Quantity % |
|---|---|---|---|---|---|
| 1 | gaseous portions | | cooling trap | 13 | 4,4 |
| 2 | liquid portions | <20° C | azeotropic mixture | 20 | 6,8 |
| 3 | fluorocarbon wax | 30- 50° C | liquid portions | 9 | 3 |
| 4 | " | 50- 75° C | toluene | 12 | 4,1 |
| 5 | " | 75-100° C | toluene | 30 | 10 |
| 6 | " | 100-125° C | toluene | 25 | 8,8 |
| 7 | " | 125-180° C | cyclohexanone | 32 | 12,8 |
| 8 | " | 180-240° C | distillation | 51 | 17,2 |
| 9 | " | 240-280° C | residue | 95 | 32 |

EXAMPLE 6

This Example shows the efficiency of a catalyst added in different rates.

In the same manner as described in the preceding Example, 350 g of polytetrafluorethylene powder taken from a spoiled batch are subjected for 8 hours, without any addition, to a temperature of 480° C in the V 4A pressure tube. After the apparatus has cooled down, the pressure is released, the vessel is emptied and the so obtained crude wax is separated by distillation. The results are listed under D in the following Table.

In the next test, 3.5 g (= 1%) of a catalyst mixture of 40% of sodium nitrite, $NaNO_2$, and 60% of potassium nitrate, $KNO_3$, are previously added to the 350 g of polytetrafluorethylene powder, and both components are thoroughly mixed. The polytetrafluorethylene thus prepared is then also heated for 8 hours at a temperature of 480° C in the tightened pressure vessl. An internal pressure of 46 atmospheres gauge is establishing itself. After termination of the test, the vessel is allowed to cool, the pressure is released, the tube is emptied and the crude pyrolysis product is distilled. The composition of this pyrolysis product can be taken from the following Table under test E.

In a further batch, under the same conditions, a polytetrafluorethylene powder to which 7 g (= 2%) of the above salt mixture hase been added is subjected for 8 hours to pyrolysis at 480° C. This batch, worked up in analogy to tests D and E, shows the composition listed under test F in the following Table.

A comparison of these tests D, E and F, carried out under the same conditions, clearly shows the influence of the catalysts used according to the invention, which influence enhances the formation of low molecular weight waxes, as well as the increased efficiency of these catalysts at increased concentration.

Material weighed in: 350 g
Period of pyrolysis: 8 hours
Temperature of pyrolysis: 480° C day. From this operation, fraction 8 results. If necessary, the still remaining wax may be further separated by distillation (fraction 9).

By this separation method, the crude wax mixture is separated into fractions having the melting points listed in the following Table.

| Test | Catalyst g | % | Pressure atmosphere gauge | Yield % | Liquid products g | % | Fluorocarbon wax/melting range: | | | | | | | |
|---|---|---|---|---|---|---|---|---|---|---|---|---|---|---|
| | | | | | | | 30–100 g | % | 100–200 g | % | 200–260 g | % | 260–300 g | % |
| Test D | 0 | 0 | 22–34 | 97,6 | 7 | 2 | 8 | 2,3 | 48 | 14 | 36 | 10,5 | 238 | 70 |
| Test E | 3,5 | 1 | 46 | 96,8 | 24 | 7 | 12 | 3,5 | 95 | 28 | 83 | 25 | 116 | 34 |
| Test F | 7 | 2 | 55 | 98,0 | 55 | 16 | 93 | 27 | 102 | 30 | 60 | 17,5 | 18 | 5,3 |

EXAMPLE 7

700 g of a still high molecular weight fluorocarbon wax having a melting range of from 323° to 326° C are introduced into a 1 liter autoclave made from Sicomal ® (a Cr-Mo steel of the 910 type) with a nickel insertion. The vessel is closed, tightened, and rapidly heated to 560° C, which temperature is maintained for 1 hour. The heating device is then switched off and the autoclave is cooled by means of a shower of compressed air. The maximum pressure during the test is 52 atmospheres gauge. The pressure is released early, the autoclave is flushed with nitrogen until completely cooled, it is then opened and emptied.

The so-obtained crumbly product is introduced into the flask of a large Soxhlet extractor, and the crude wax is extracted for 2 days with FRIGEN ® 113 (trifluoro-trichloroethane). The product is then allowed to cool down and to stand overnight. The following day, the product precipitated from the solution in the form of well-shaped crystals is isolated (fraction 1). To the separated clear trifluorotrichloro-ethane solution about the same amount by volume of toluene is added and both liquids are thoroughly mixed, whereby a white, microcrystalline precipitate is formed again (fraction 2). Also this fraction is isolated, and the solution is concentrated anew by slowly distilling off the FRIGEN ® 113 via a compact column having a length of 75 cm. As soon as the temperature at the top rises above the boiling point of the FRIGEN ®, the distillation is stopped, and the wax containing toluene solution remaining in the sump is then distilled off via a vertically mounted Liebig condenser. The fluorocarbon waxes becoming also volatile precipitate again at once in the condenser and are washed into the cooled receiver by the toluene. The receiver is often replaced, and the toluene separated from the wax is at once fed back in the distilling flask until the moment where nearly no solid products are washed into the receiver. The fluorocarbon wax fractions so obtained are dried in known manner and freed from solvent residues (fractions 3 to 6).

The residue of the Soxhlet apparatus is dried, weighed and again extracted with tetrafluoro-dibromo-ethane or hexa-fluoro-dibromo-propane for a whole Material weighed in the Soxhlet apparatus: 504 g.

| Fraction | Substance | Melting range | Quantity g | % |
|---|---|---|---|---|
| 1 | Fluorocarbon wax | 150–160° C | 53 | 7,6 |
| 2 | " | 100–115° C | 59 | 8,4 |
| 3 | " | 55–65 | 14 | 2 |
| 4 | " | 65–75 | 35 | 5 |
| 5 | " | 75–90 | 21 | 3 |
| 6 | " | 90–100 | 27 | 3,8 |
| 7 | " | 110–130 | 29 | 4,1 |
| 8 | " | 160–180 | 31 | 4,5 |
| 9 | " | 200–240 | 64 | 9 |
| 10 | " | 240–290 | 133 | 19 |

Residues of the liquid degradation products and a certain amount of the readily soluble, low melting fluorocarbon waxes are lost because they repeatedly become volatile together with the solvent and then dissolve at once in it. These losses may be avoided by making the solvents used circulate in a closed circuit, i.e. by always using solvents saturated with the corresponding fluorocarbon waxes.

We claim:

1. Process for the preparation of solid fluorocarbon waxes which process consists essentially of thermic cracking of polytetrafluorethylene or copolymers of tetrafluorethylene and higher perfluoro-olefins at elevated temperatures and under increased pressures, wherein the pyrolysis is carried out at temperatures of from 350° to 700° C and under partial pressures of the degradation products of from 5 to 100 atmospheres gauge.

2. Process as claimed in claim 1, wherein the pyrolysis is carried out at temperatures of from 450° to 600° C.

3. process as claimed in claim 1, wherein the pyrolysis is carried out under partial pressures of the decomposition products in the range of from 15 to 60 atmospheres gauge.

4. Process as claimed in claim 2 wherein the pyrolysis is carried out under partial pressures of the decomposition products in the range of from 15 to 60 atmospheres gauge.

* * * * *